United States Patent
Godin et al.

(10) Patent No.: US 12,464,542 B2
(45) Date of Patent: Nov. 4, 2025

(54) MULTICAST-BROADCAST SERVICE TUNNEL HANDLING

(71) Applicant: Nokia Solutions and Networks Oy, Espoo (FI)

(72) Inventors: Philippe Godin, Versailles (FR); David Navratil, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 240 days.

(21) Appl. No.: 18/005,872

(22) PCT Filed: Jul. 30, 2020

(86) PCT No.: PCT/EP2020/071570
§ 371 (c)(1),
(2) Date: Jan. 18, 2023

(87) PCT Pub. No.: WO2022/022832
PCT Pub. Date: Feb. 3, 2022

(65) Prior Publication Data
US 2023/0354381 A1    Nov. 2, 2023

(51) Int. Cl.
*H04W 76/12*    (2018.01)
*H04W 72/30*    (2023.01)
*H04W 28/084*   (2023.01)

(52) U.S. Cl.
CPC ........... *H04W 72/30* (2023.01); *H04W 76/12* (2018.02); *H04W 28/084* (2023.05)

(58) Field of Classification Search
CPC ... H04W 72/30; H04W 76/12; H04W 28/084; H04W 36/0007; H04W 76/22; H04W 76/40; H04W 4/06; H04L 12/189
See application file for complete search history.

(56) References Cited

U.S. PATENT DOCUMENTS

| 10,206,147 B2 | 2/2019 | Horn et al. |
| 10,581,813 B2 | 3/2020 | Watfa et al. |

(Continued)

FOREIGN PATENT DOCUMENTS

| CN | 101119513 A | 2/2008 |
| EP | 2200367 A1 | 6/2010 |

(Continued)

OTHER PUBLICATIONS

Office action received for corresponding European Patent Application No. 20750243.6, dated Nov. 12, 2024, 8 pages.

(Continued)

*Primary Examiner* — Lakeram Jangbahadur
(74) *Attorney, Agent, or Firm* — Lippes Mathias LLP (57) ABSTRACT

There is provided a method for a second network node, the method comprising: receiving a message from a first network node configured to provide a multicast-broadcast service, MBS, for a user equipment, UE, the message comprising an MBS identifier identifying the MBS and at least one data flow identifier corresponding to at least one data flow, for providing the MBS, to be offloaded from the first network node to the second network node; determining whether or not a tunnel, between the second network node and a user plane entity, associated with the MBS identifier exists; on the basis of the determining, transmitting, to the first network node, a response message indicating whether or not a new tunnel for the MBS is requested to be established; and utilizing the existing tunnel or said new tunnel requested to be established for providing the MBS.

6 Claims, 5 Drawing Sheets

(56) References Cited

U.S. PATENT DOCUMENTS

| | | | |
|---|---|---|---|
| 2010/0075659 A1 | 3/2010 | Kim et al. | |
| 2012/0287840 A1 | 11/2012 | Hayashi | |
| 2013/0089076 A1* | 4/2013 | Olvera-Hernandez | ........................ H04W 36/08 370/332 |
| 2015/0181473 A1* | 6/2015 | Horn | ..................... H04W 72/51 |
| 2019/0223250 A1* | 7/2019 | Dao | ..................... H04W 72/23 |
| 2019/0357075 A1* | 11/2019 | Van Der Velde | ..... H04W 36/08 |
| 2020/0092923 A1* | 3/2020 | Abraham | ............ H04L 41/5003 |
| 2020/0389810 A1* | 12/2020 | Wang | ................ H04W 28/0268 |

FOREIGN PATENT DOCUMENTS

| | | | | |
|---|---|---|---|---|
| WO | 2012/042163 A1 | 4/2012 | | |
| WO | WO-2018110952 A2 * | 6/2018 | ............ | H04W 28/02 |
| WO | 2019/030981 A1 | 2/2019 | | |
| WO | WO-2019160298 A1 * | 9/2019 | ........ | H04W 28/0252 |
| WO | 2020/032854 A1 | 2/2020 | | |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"3rd Generation Partnership Project; Technical Specification Group Radio Access Network; NG-RAN; NG Application Protocol (NGAP) (Release 16)", 3GPP TS 38.413, V16.1.0 , Mar. 2020, pp. 1-341.

"New Work Item on NR support of Multicast and Broadcast Services", 3GPP TSG RAN Meeting #86, RP-193248, Agenda Item: 9.1.2, Huawei, Dec. 9-12, 2019, 5 pages.

International Search Report and Written Opinion received for corresponding Patent Cooperation Treaty Application No. PCT/EP2020/071570, dated Sep. 25, 2020, 14 pages.

Office Action received for corresponding Japanese Patent Application No. 2023-506349, dated Feb. 26, 2024, 2 pages of Office Action and 2 pages of summary available.

Office Action received for corresponding Chinese Patent Application No. 202080105626.2, dated May 17, 2024, 13 pages of Office Action and no page of translation available.

* cited by examiner

MULTICAST-BROADCAST SERVICE TUNNEL HANDLING

RELATED APPLICATION

This application was originally filed as PCT Application No. PCT/EP2020/071570, filed on Jul. 30, 2020, which is incorporated herein by reference in its entirety.

TECHNICAL FIELD

The following exemplary embodiments relate to communications.

BACKGROUND

Modern wireless communication networks provide different kind of services to user equipment (UE). It may be beneficial to develop solutions that target enhancing effectiveness of such services. One example of such services may be Multicast-Broadcast Service (MBS).

BRIEF DESCRIPTION

According to an aspect, there is provided the subject matter of the independent claims. Some embodiments are defined in the dependent claims.

According to an aspect, there is provided a computer program comprising instructions for causing an apparatus to perform a method according to any one of claims 1 to 6.

The embodiments that do not fall under the scope of the claims are to be interpreted as examples useful for understanding the disclosure.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

The following embodiments are examples. Although the specification may refer to "an", "one", or "some" embodiment(s) in several locations, this does not necessarily mean that such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1A:
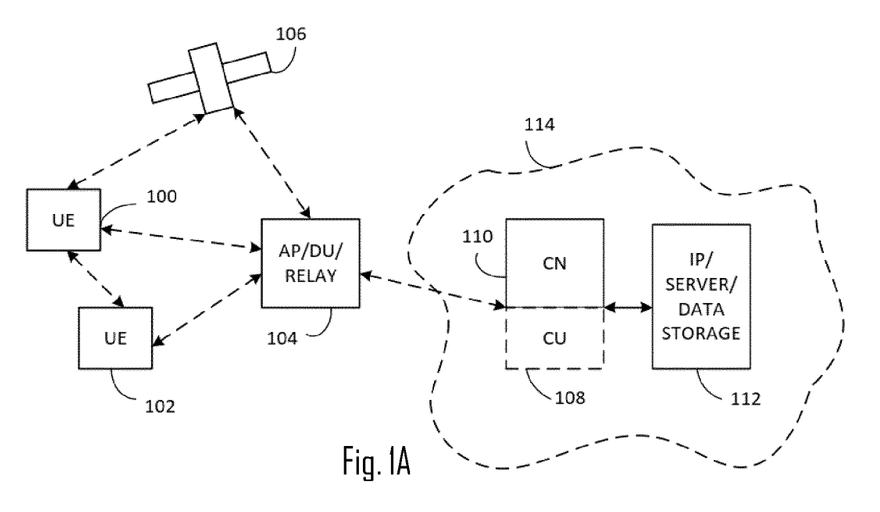
FIG. 1A illustrates an example of a wireless communication system to which embodiments may be applied.

FIG. 1A depicts examples of simplified system architectures showing some elements and functional entities whose implementation may differ from what is shown. The connections shown in FIG. 1A are logical connections; the actual physical connections may be different. It is apparent to a person skilled in the art that the system typically comprises also other functions and structures than those shown in FIG. 1A.

The embodiments are not, however, restricted to the system given as an example but a person skilled in the art may apply the solution to other communication systems provided with necessary properties.

The example of FIG. 1A shows a part of an exemplifying radio access network. FIG. 1A shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobility management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink device, of which an example is a camera or video camera loading images or video clips to a network. A user device may also be a device having capability to operate in Internet of Things (IoT) network, such as Industrial IoT (IIoT) network, which is a scenario in which objects are provided with the ability to transfer data over a network without needing human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses. User device herein may also refer to vehicular implementations, such as vehicle UEs. Such UEs may be comprised and/or communicatively coupled with vehicle such that they may be understood as part of the vehicle or vehicles.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not necessarily shown in FIG. 1A) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the substantially same infrastructure to run services that have different requirements on latency, reliability, throughput and mobility.

The current architecture in LTE networks is fully distributed in the radio and typically fully centralized in the core network. The low-latency applications and services in 5G may need to bring the content close to the radio which leads to local break out and multi-access edge computing (MEC). 5G enables analytics and knowledge generation to occur at the source of the data. This approach may need leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1A by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is an example of a part of a radio access system and in practice, the system may comprise a plurality of (e/g) NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1A may provide any kind of these cells. A cellular radio system may be implemented as a multilayer network including several kinds of cells. Typically, in multilayer networks, one access node provides one kind of a cell or cells, and thus a plurality of (e/g)NodeBs may be needed to provide such a network structure.

For fulfilling the need for improving the deployment and performance of communication systems, the concept of "plug-and-play" (e/g)NodeBs has been introduced. Typically, a network which is able to use "plug-and-play" (e/g) Node Bs, includes, in addition to Home (e/g)NodeBs (H(e/ g)nodeBs), a home node B gateway, or HNB-GW (not shown in FIG. 1A). A HNB Gateway (HNB-GW), which is typically installed within an operator's network may aggregate traffic from a large number of HNBs back to a core network. The network discussed herein may refer to, for example, cellular network such as 5G and the like.

As indicated with an arrow in FIG. 1A, the UEs 100, 102 (and/or any other UE of the described system) may support device-to-device (D2D) communication. D2D communication may sometimes be referred to as sidelink communication.

One of the development objectives in NR is multicast-broadcast service (MBS) or MBSs. MBS may comprise either or both of multicast transmission and broadcast transmission. MBS service may be provided to UEs, for example, by network node 104 as point-to-point (PtP) or point-to-many (PtM) transmission. The former may sometimes be referred to as unicast transmission and the latter as multicast transmission. Furthermore, MBS may be provided to UEs in dual connectivity (DC) scenarios in which one UE may be connected to two or more network nodes providing one or more services to said UE. For example, in DC there may be a master network node (simply master node (MN)) and a secondary network node (simply secondary node (SN)) controlled by the master network node (or some other entity), wherein MN and SN work together to provide the MBS to the UE. MN and SN may be similar as described with respect to FIG. 1A (see e.g. node 104). For example, MN and SN may both be connected to UE, and provide substantially same or different service(s) to the UE. MBS may sometimes be referred to as 5 MBS. Particularly, such term may be used for MBS provided in 5G or NR system, for example.

Figure 1B:
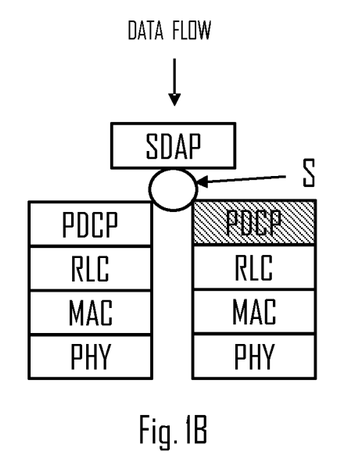
FIGS. 1B and 1C illustrate some example wireless communication system architectures to which embodiments may be applied.
Figure 1C:
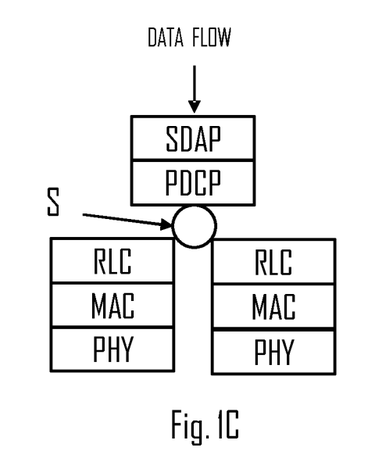

FIGS. 1B and 1C illustrate some examples of wireless communication system architectures to which the embodiments may be applied. SDAP may refer to Service Data Adaptation Protocol, PDCP to Packet Data Convergence Protocol, RLC to Radio Link Control, MAC to Medium Access Control, and PHY to Physical layer. S may denote the location in the protocol stack where data replication and forwarding (i.e. switching) takes place. Data flow is depicted with arrows showing the data flow direction in the different protocol layers from SDAP to PHY.

Referring to FIG. 1B, Layer 2 (L2) architecture alternative 1 is depicted that uses a DRB for PtP transmission and an SC-MRB for PtM transmission. The network may configure a DRB for at least one UE in multicast group and one SC-MBR for a multicast group (i.e. per session).

Referring to FIG. 1C, L2 architecture alternative 2 is depicted that uses a SC-MRB for both PtP and PtM transmissions in a split bearer matter, i.e. PDCP PDUs may be transmitted either a PtP leg of the bearer or PtM leg. At least one leg of SC-MRB bearer may have its own RLC entities. It should be noted that in regard to F1-U interface the L2 architecture alternative 1 may utilize F1-U tunnel for at least one radio bearer, i.e. at least one DRB as well as for at least one SC-MRB. In case of the L2 architecture alternative 2, one shared F1-U tunnel may be used if the data replication and forwarding function is located in DU.

It is noted that the example architectures of FIGS. 1B and 1C should be understood as examples, and that other type of architectures may be utilized to which the embodiments may be applied.

So, in general, MBS may be provided to UE in DC scenario. For example, UE utilizing a certain MBS may be served by MN. There may be cases in which the serving node is beneficial to be changed to SN. Therefore, it may be beneficial to further develop solutions to enhance dynamic switching of serving node for providing MBS to UE(s). Switching may take place between PtP and PtM transmissions, for example.

Figure 2:
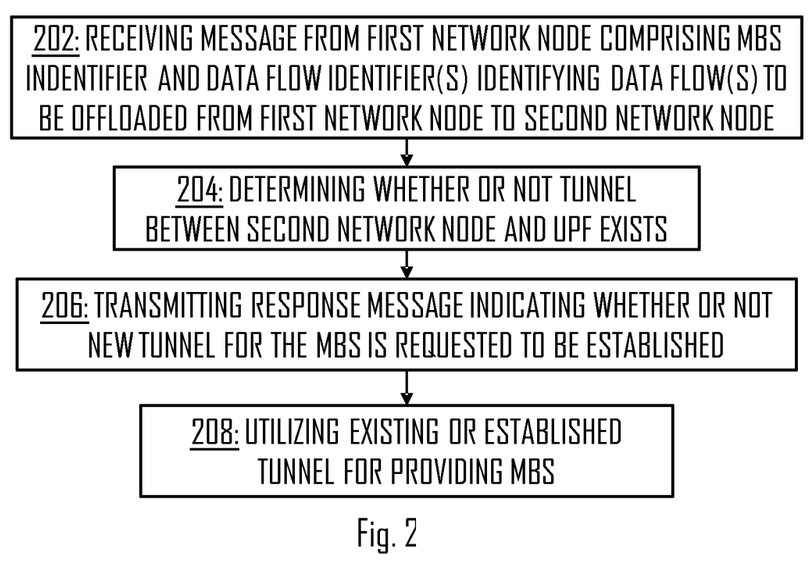
FIGS. 2 and 3 illustrate flow diagrams according to some embodiments.

FIG. 2 illustrates a flow diagram according to an embodiment. Referring to FIG. 2, a method for a second network node of a wireless communication network is provided, the method comprising: receiving a message from a first network node configured to provide a MBS for a UE, the message comprising an identifier identifying the MBS and at least one data flow identifier corresponding to at least one data flow, for providing the MBS, to be offloaded from the first network node to the second network node (block 202); determining whether or not a tunnel, between the second network node and a user plane function, associated with the MBS identifier exists (block 204); on the basis of the determining, transmitting, to the first network node, a response message indicating whether or not a new tunnel for the MBS is requested to be established (block 206); and utilizing the existing tunnel or said new tunnel requested to be established for providing the MBS (block 208).

Figure 3:
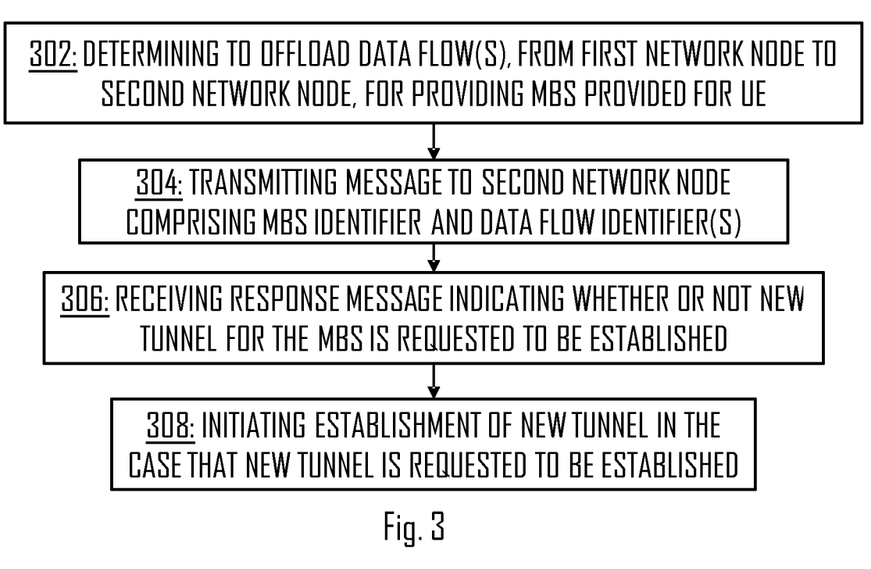

FIG. 3 illustrates a flow diagram according to an embodiment. Referring to FIG. 3, a method for a first network node of a wireless communication network is provided, the method comprising: determining to offload, to a second network node, at least one data flow for providing a MBS provided for a UE (block 302); transmitting a message to the second network node, the message comprising an identifier identifying the MBS and at least one data flow identifier corresponding to the at least one data flow to be offloaded from the first network node to the second network node (block 304); receiving, from the second network node, a response message indicating whether or not a new tunnel between the second network node and a user plane function is requested to be established for providing the MBS (block 306); and in the case that said new tunnel is requested to be established, initiating establishment of said new tunnel (block 308).

The described methods of FIGS. 2 and 3 may be applicable in the system (i.e. wireless communication network) of FIG. 1A, for example, and in the architectures depicted in FIGS. 1B and 1C, for example. The UE(s) discussed with respect to FIGS. 2 and 3 may be, for example, UE 100, or UE 102, or some other similar network device(s). The network nodes discussed with respect to FIGS. 2 and 3 may refer to network node 104, or to CN 110/CU 108, for example, or to some other network element configured to carry out the described method steps. Particularly, in some example embodiments, first network node may refer to MN and second network node to SN. The described solution may enable the switching from PtP to PtM in providing the MBS, for example, in the case that the serving node (e.g. first network node) determines to offload the MBS data flows (sometimes referred to as traffic flows or MBS traffic flows) to another node (e.g. second network node).

Tunnel described with reference to FIGS. 2 and 3 may be a tunnel that enables MBS data transfer from user plane core network node (e.g. User Plane Function (UPF)) to a network node (e.g. radio network node). That is, the tunnel may be established for a certain MBS(s) having a certain identifier (i.e. MBS identifier) between the user plane core network node (e.g. UPF) and network node providing the MBS to UE(s). For example, second network node and UPF may be connected via tunnel for MBS. This kind of tunnel may sometimes be referred to as N3 tunnel. In a sense, it may be understood that the MBS may be provided to the second network node via the described tunnel, and the second network node may provide the MBS to one or more UEs. Target of the MBS may be the one or more UEs, for example.

The identifier identifying the MBS may sometimes be referred to as MBS identifier. Data flow identifier may correspond to (i.e. identify) a data flow. Hence, if more than one data flow exists or is utilized to provide the MBS, there may be one data flow identifier for identifying the members of the at least one data flow. Sometimes, the data flow may be described as a Quality of Service (QoS) flow identified by QoS flow indicator (QFI). QFI may identify (or correspond to) a QoS flow. For example, if two MBS QoS flows (i.e. QoS flows for MBS) are used, first QFI may be associated with a first QoS flow and a second QFI with a second QoS flow. In this example, both first and second QoS flows may be used for providing the MBS identified by the MBS identifier (or simply identifier). One or more QoS flows may be used to provide a given MBS to a UE or UEs. The QoS flow(s) may utilize the existing or established tunnel (e.g. N3 tunnel).

According to an embodiment, the at least one data flow described herein comprises and/or is at least one QoS flow.

As indicated in block 208, existing tunnel or a new tunnel (i.e. requested to be established in block 206) may be utilized for providing the MBS, for example, to the UE or UEs. So, if or when it is determined (i.e. block 204) that the tunnel does exist, the existing tunnel may be used for providing the MBS. However, if or when it is determined (i.e. block 204) that the tunnel does not exist, a new tunnel for the MBS may be requested to be established (block 206) and utilized (block 208) for providing the MBS. The tunnel establishment may take place after the request is sent to the first network node. The first network node may in turn transmit a tunnel generation request message to the Session Management Function (SMF).

The proposed solution may enable the use of the substantially same tunnel for providing the MBS to a plurality of UEs. For example, if three UEs receive the substantially same MBS service, the MBS data may not need to be replicated three times over the tunnel, but sent one time between UPF and the network node. There may be plurality of tunnels for a given node, for example, one for at least one MBS provided to UE(s). For instance, if first network node provides UE 100 an MBS, it may have a tunnel to UPF in order to receive and/or transmit the applicable data flows. Substantially same tunnel may be utilized, by the first network node, in providing the substantially same MBS to UE 102, for example. In the first example, first network node may provide PtP transmission to UE 100, and in the latter example PtM to UEs 100 and 102. Similarly, as presented above in the proposed method, the second network node may utilize an existing tunnel to provide MBS to a plurality of UEs (e.g. two or more UEs). Or, if the tunnel does not exist, the tunnel may be created and then be used to provide the MBS to at least one UE (i.e. later possibly to more than one UE if need be). For example, in the case that the tunnel for a certain MBS exists, the transfer from MN served UE to SN served UE may be fluent. It is also noted that the MN does not necessarily know that the SN already has a tunnel for offloaded MBS. That is, the SN may provide the MBS to a UE that is offloaded to the SN from a different MN.

In an embodiment, the second network node provides a Primary Secondary Cell (PSCell). In an embodiment, the second network node is in PtP mode. However, the second network node may change the mode to PtM.

Figure 4A:
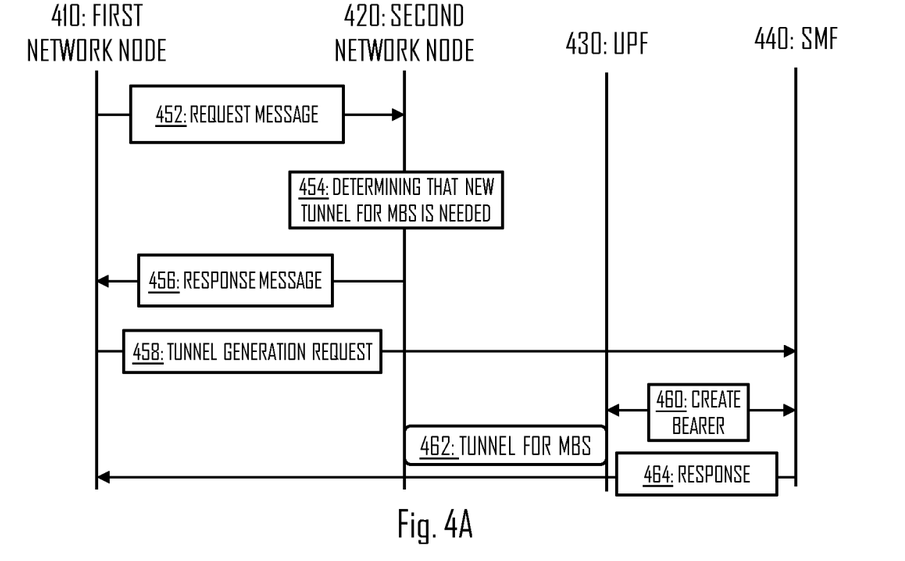
FIGS. 4A, 4B, 4C, and 5 illustrate signal diagrams according to some embodiments.
Figure 4B:
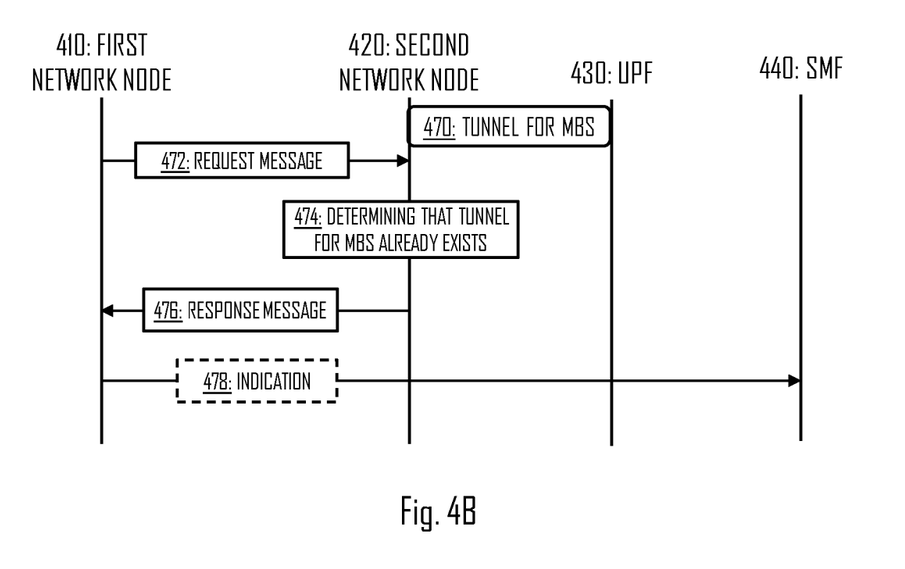
Figure 4C:
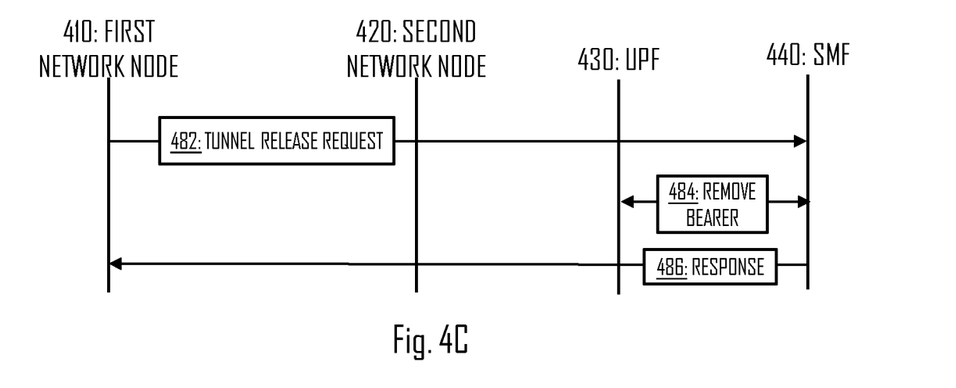

Let us discuss in detail some aspects with reference to FIGS. 4A to 4C illustrating some embodiments. Let's first refer to FIG. 4A, illustrating an embodiment in which a tunnel for MBS does not exist between the UPF 430 and second network node 420 when the request message 452 is received by the second network node 420. That is, the second network node 420 may not, at that time, provide the MBS to UE or UEs. So, in block 452, the first network node 452 may transmit the request message to the second network node 420. The request message may be similar as the message described with respect to FIGS. 2 and 3 (blocks 202 and 304). Said message may indicate that the MBS, or particularly the one or more data flows of the MBS, is to be offloaded from the first network node 410 to the second network node 420, and further indicate the MBS to be offloaded. The first network node may thus indicate, in said message, that the offloaded data flows are for MBS. So, said message may be sent by the first network node 410 after and/or in response to determining that the MBS should be offloaded to the second network node 420. The first network node 410 may determine to offload the MBS based on, for example, load at the first network node exceeding a threshold, or the second network node 420 having excess capacity. The transmitting the request message in block 452 may be comprised in a DC bearer setup in which the first network node 410 sets up the DC bearer in a radio cell provided by the second network node 420. The first network node 410 may inform the second network node 420 that the offloaded QoS flows are for MBS unicast, and it provide the corresponding MBS ID (e.g. Mcast ID=1) to second network node 420. This may enable the second network node 420 to identify that the QoS flows is for a given MBS service and to detect if a tunnel already exists or not for this service.

In an embodiment, the request message comprises an identifier (e.g. MBS identifier) identifying the MBS. For example, for a given MBS (e.g. MBS service 1) this may mean that Mcast ID=1. An MBS service may comprise on or more data flows which may sometimes be referred to as and/or transmitted on Quality of Service (QoS) flows. The QoS flow may be the lowest level of granularity with which the 5G system may differentiate user data and provide differentiated treatment (i.e. quality of service). QoS flow may be identified by a QoS Flow ID (QFI) and may have an associated QoS profile. In some example embodiments, said message may comprise list of data QoS flows and/or their associated profiles. The described message may be referred to as request message as it may request the SN to start serving the UE with indicated MBS. The request message may sometimes be referred to as SN addition/modification request, or simply message as discussed with respect to FIGS. 2 and 3.

In block 454, the second network node 420 may determine that a new tunnel for the MBS is needed between the second network node 420 and the UPF 430. Particularly, the new tunnel may be needed for transferring the one or more data flows of the MBS between the second network node 420 and the UPF 430. The determination may be based on detecting that there is no tunnel for the MBS between said node 420 and UPF 430. For example, using the above MBS identifier Mcast ID=1, the network node 420 may determine that it has no tunnel for Mcast ID=1.

The second network node 420 may transmit a response message to the first network node in block 456. In the case that the new tunnel is needed as determined in block 454, the response message may indicate that the new tunnel is needed. In an embodiment, the response message is transmitted in response to determining whether or not a new tunnel is needed for the MBS (e.g. in response to block 454).

In an embodiment, the response message of block 456 comprises a transport network layer information (TNLI) for establishing the new tunnel between the second network node 420 and the UPF 430. The TNLI may thus be used by the network to setup the new tunnel. TNLI may comprise information on the tunnel (e.g. N3 tunnel) that is to be established. For example, TNLI may comprise an IP address of tunnel endpoint and a tunnel endpoint identifier. The second network node 420 may allocate a new TNLI for the MBS (i.e. in the case that tunnel for offloaded MBS does not exists), and indicate this allocated TNLI to the first network node 410 in order to set up the new tunnel.

The response message may sometimes be referred to as SN Addition/Modification Request Acknowledge message. In some embodiments, the message includes the list of MBS QoS flows that could be accepted by the second network node 420. In some embodiments, the message may indicate accepted QoS flows with their mapped DRB and including the TNLI to be used for the tunnel to be setup. Note that DRB may be indicated, for example, if the architecture alternative 1 (see FIG. 1B) is used. Accepted QoS flows may indicate the substantially same QoS flows or a subset of the QoS flows that were requested to be offloaded to the second network node 420. In some cases, it may be possible that a subset of the requested flows are accepted by the second network node 420, and that remaining flows are either provided by the first network node 410 or offloaded to some other network node. However, the tunnel between the second network node 420 and the UPF 430 may still be established if at least one data flow configured to be used for providing the MBS (or simply referred to as MBS data flow) is accepted by the second network node 420.

In block 458, the first network node 410 may initiate establishment of the requested new tunnel by transmitting a tunnel generation request to a session management function (SMF) 440. In an embodiment, the tunnel generation request comprises the TNLI received from the second network node 420 via the response message transmitted in block 456. In some example embodiments the tunnel generation request is a Protocol Data Unit (PDU) Session Modify Indication message.

In block 460, the SMF 440 may request the UPF 430 to create a tunnel with the received TNLI. The generation of the tunnel 462 between the second network node 420 and UPF 430 may comprise creating a bearer for the tunnel as shown in block 460. The tunnel may be generated, by the UPF 430, according to the TNLI indicated by the second network node 420 to the first network node 410, and reported from node 410 to the SMF 440 and from SMF 440 and further to UPF 430. The created tunnel 462 may be used for providing the MBS to a UE or UEs by the second network node 420.

In block 464, the SMF 440 may acknowledge the reception of the tunnel generation request 458 and a successful creation of the tunnel by the UPF 430 to the first network node 410 by transmitting a response to the tunnel generation request.

Let us then refer to FIG. 4B illustrating some embodiments in which tunnel (block 470) for offloaded MBS already exists when request message is received (block 472). Request message of block 472 may be similar or substantially same as in block 452. I.e. certain MBS may be indicated in the message, wherein the MBS may be offloaded to the second network node 420.

In block 474, the second network node 420 may determine that a tunnel for the MBS to be offloaded already exists between the node 420 and UPF 430. The tunnel may have been generated, for example, prior to receiving the request message in block 474. The tunnel may have been generated, for example, for providing the MBS to some other UE(s) based on a request message (e.g. similar as in block 452 or 472) received from another network node (e.g. third network node).

In block 476, the second network node 420 may transmit a response message to the first network node 410. Said message may indicate that a tunnel for the MBS already exists. In other words, this may mean that the message indicates that no new tunnel is requested to be established.

In an embodiment, the response message of block 476 comprises TNLI corresponding to the existing tunnel for the MBS and/or an additional indicator for indicating that a new tunnel for the MBS is not requested to be established. Said additional indicator may be, for example, a flag such as a one-bit indicator. The TNLI may be understood to be TNLI of the existing tunnel, for example. Said additional indicator may sometimes be referred to simply as an indicator for indicating that a new tunnel for the MBS is not requested to be established. It may be used independently or together with the TNLI to indicate that now new tunnel is needed (e.g. tunnel for said TNLI already exists). As said, it may not be necessary to indicate the TNLI, but it may be beneficial in some cases.

In an embodiment, the response message of block 476 is generated such that it does not include TNLI on the existing tunnel. That is, the message may not comprise TNLI, or at least not on the already existing tunnel (i.e. tunnel 470).

The message of block 476 may sometimes be referred to as SN Addition/Modification Request Acknowledge message and may further include the list of MBS flows that may be accepted.

Based on the response message of block 476, the first network node 410 may determine that no new tunnel is needed to perform the DC offloading of the MBS.

In an embodiment, the first network node 410 sends an indication, in block 478, to the SMF 440 indicating the TNLI and the additional indicator or without the TNLI. However, this may not be always necessary in the described embodiments. Instead, the first network node 410 may not send this PDU Session Modify Indication message as no new tunnel is to be setup. In both cases, the SMF 440 may determine, based on the transmitted or not transmitted indication, that no new tunnel is needed, and thus may not request UPF 430 to open additional tunnel(s) for the second network node 420.

Thus, in an embodiment, the first network node 410 determines, based on the response message (block 476), that a tunnel for the MBS between the second network node and the user plane function already exists; and based on the determining, indicates to the SMF 440 that the tunnel for the MBS between the second network node 420 the user plane function 430 already exists. This indication may comprise transmitting the indication (see e.g. block 478) or it may be an implicit indication. That is, the first network node 410 may prevent sending the the tunnel generation request to the SMF 440. Even though, the PDU Session Modify Indication message would be sent, it may not be tunnel generation request in the sense that it may not request creation of a new tunnel. That is, in one example, the message may be sent without including transport network layer information, as already discussed above. In another example, the message may be sent including transport network layer information and an additional indicator (e.g. flag) for indicating that a new tunnel for the MBS is not requested to be established. I.e. the tunnel for the indicated TNLI already exists. In another example, the message may be sent without including transport network layer information but including an additional indicator (e.g. flag) for indicating that a new tunnel for the MBS is not requested to be established.

In an embodiment, the determining, by the first network node 410, that said tunnel exists is based on said response message comprising TNLI on said tunnel and an additional indicator for indicating that a new tunnel for the MBS is not requested to be established.

In an embodiment, by the first network node 410, the determining that said tunnel exists is based on the response message not comprising TNLI on said tunnel.

FIG. 4C illustrates an embodiment. Referring to FIG. 4C, in block 482, the first network node 410 may transmit a tunnel release request to the SMF 440 in response to and/or after determining that the first network node 410 no longer serves UEs for a given MBS. That is, if, for example, after offloading the MBS to the second network node 420 (as in FIGS. 4A and 4B), the first network node 410 no longer provides the MBS to any UEs, the tunnel between the first network node 410 and the UPF 430 may not be needed anymore. Hence, the tunnel may be released. The release request may sometimes be referred to as a PDU Session Modify Indication. The tunnel release request may comprise the TNLI associated with the to be released tunnel, i.e. the TNLI may indicate the tunnel to be released. Based on the request, the SMF 440 may communicate with the UPF 430 to release the tunnel, for example, by removing the bearer (block 484). The SMF 440 may further acknowledge the tunnel release request or at least the reception of the request to the first network node 410 (block 486).

It is noted at this point that the request messages transmitted in FIGS. 4A and 4B (blocks 452 and 472) may be transmitted by one or more MN regarding one or more UEs.

Figure 5:
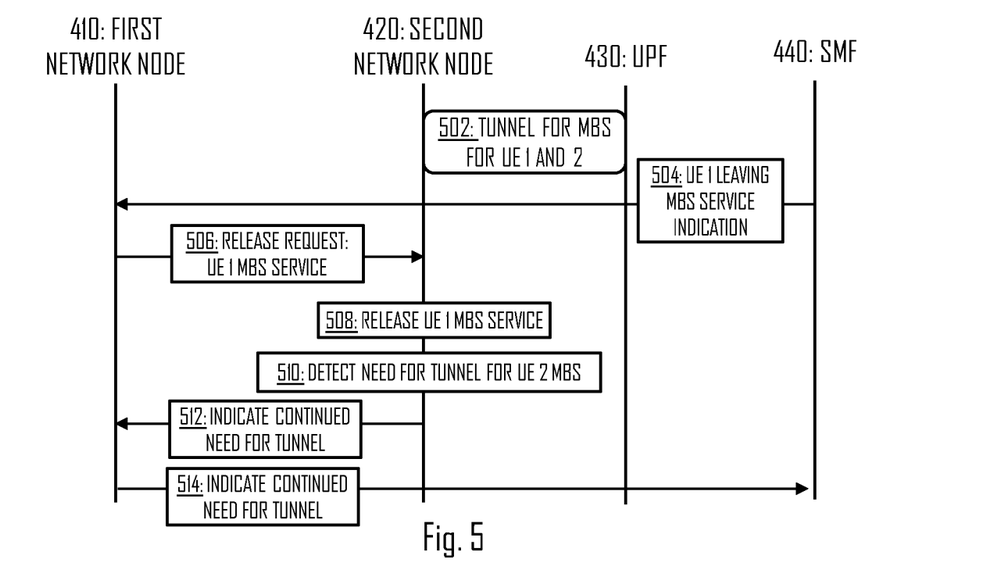

Let us then draw attention to FIG. 5 illustrating an embodiment relating to cases in which UE is leaving the MBS or a cell provided by the second network node 420 serving the UE with the MBS. That is, as shown in block 502, the second network node 420 may have a tunnel between the second network node 420 and the UPF 430 for providing MBS to at least two UEs. For the sake of simplicity, let's assume that there are two UEs to which the tunnel for the MBS is established: UE 1 and UE 2.

The first network node may determine, based e.g. on indication received from SMF 440 in block 504, that there is a need to release at least one data flow configured to be used for providing the MBS for a served UE. In this example, the UE may be UE 1. The MBS to be released may be indicated in the message of block 504 e.g. by using the MBS identifier of the MBS. In some embodiments, the message of block 504 is transmitted as PDU Session Modify Request message. Said message may thus request the second network node 420 to release the MBS bearer (i.e. for a given MBS) for UE 1.

In block 506, the first network node 410 may transmit a release request to the second network node 420. The release request may indicate that the at least one data flow configured to be used for providing the MBS needs to be released. I.e. the MBS service for UE 1 needs to be released. The release request may indicate the data flow(s) to be released or simply the MBS to be released e.g. using MBS identifier.

The second network node 420 may receive the request, regarding the UE 1, to release at least one data flow associated with the MBS; and release the at least one data flow according to the request (block 508).

However, in block 510, the second network node 420 may determine a need for continue utilizing the tunnel 502 between the second network node 420 and the UPF 430 for providing the MBS to at least one other UE. In this example, the UE may be UE 2. This determination may be performed after releasing the MBS service.

Hence, in block 512, the second network node 420 may indicate, to the first network node 410, the need to continue utilizing said tunnel 502. This indication may comprise, for example, the TNLI so that the correct tunnel may be identified and/or a flag indicating continued need for the tunnel, i.e. the existing tunnel should not be released.

The first network node 410 may receive said indication and further indicate said need to the SMF 440 (block 514). This indication may comprise, for example, TNLI so that the correct tunnel may be identified and/or a flag indicating continued need for the tunnel. The SMF 440 may thus prevent requesting the UPF 430 from terminating or releasing the tunnel 502. Thus, UE 2 may be continued to be served, by the second network node 420, with the MBS. The indication of block 514 may comprise transmitting a message to the SMF, as described above, or it may be an implicit indication. For example, the first network node 410 may prevent sending a tunnel release request to the SMF 440. That is, the SMF 440 may be configured to operate so that it initiates releasing a tunnel in response to receiving an explicit message requesting the release. So, if no such message/request is received, the SMF 440 may not release or terminate the tunnel or tunnels.

So, even though the UE 1 leaves the MBS service in the second network node 420, the second network node 420 may not release the tunnel, and continue to use the tunnel to serve UE 2.

According to an aspect, there is provided a method for a session management entity, the method comprising: receiving, from a first network node 410, a tunnel generation request comprising no TNLI or TNLI and an additional indicator (e.g. flag) for indicating that a new tunnel for an MBS is not requested to be established; determining, based on the request, that a tunnel between a user plane entity and the second network node 420 for the MBS already exists; and based on the determining, preventing initiating establishment of a new tunnel between the user plane entity and the second network node 420.

As used herein, SMF 440 may sometimes be referred to simply as session management entity and UPF 430 as user plane entity.

Some benefits of the proposed solution may at least include:

- When MBS is offloaded to SN with DC for a MBS ID=1, the MN may not need to ask the SMF for the creation of the tunnel between UPF and SN in the case the SN was already involved in the requested MBS ID=1. Involved here may mean that the SN already provides MBS with ID=1 to some other UE or UEs. Naturally, ID may be different from 1 which is used herein as an example.
- When MBS is offloaded back to MN (e.g. because UE is leaving the MBS service 1), MN may not ask SMF for releasing the tunnel between UPF and SN if SN is still involved in the MBS service, i.e. still continues to provide the MBS ID=1 to some other UE or UEs.

Figure 6:
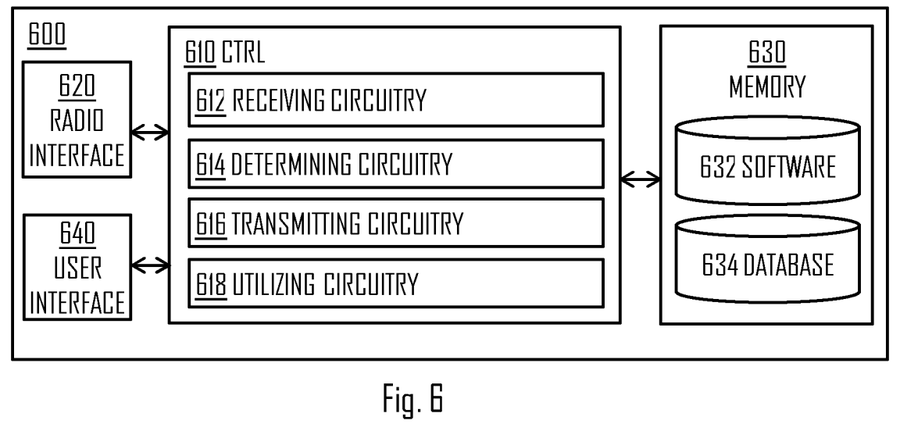
FIGS. 6 and 7 illustrate apparatuses according to some embodiments.
Figure 7:
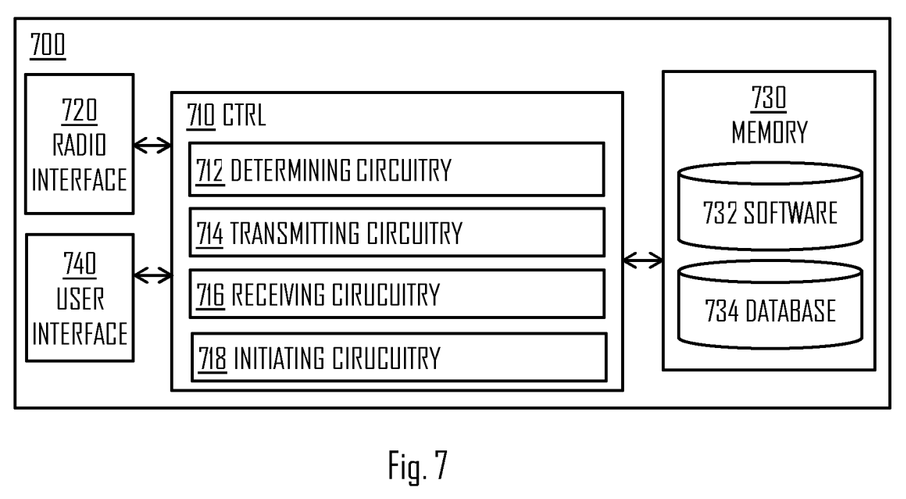

FIGS. 6 and 7 provide apparatuses 600, 700 comprising a control circuitry (CTRL) 610, 710, such as at least one processor, and at least one memory 630, 730 including a computer program code (software) 632, 732, wherein the at least one memory and the computer program code (software) 632, 732, are configured, with the at least one processor, to cause the respective apparatus 600, 700 to carry out any one of the embodiments of FIGS. 1A to 5, or operations thereof.

Referring to FIGS. 6 and 7, the memory 630, 730, may be implemented using any suitable data storage technology, such as semiconductor based memory devices, flash memory, magnetic memory devices and systems, optical memory devices and systems, fixed memory and removable memory. The memory 630, 730 may comprise a database 634, 734 for storing data.

The apparatus 600, 700 may further comprise radio interface (TRX) 620, 720 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas. TRX may provide access to F1 and/or Xn interface, for example, and/or provide UL/DL communication capability. Further, TRX may provide D2D capability for UEs. For example, the TRX may enable using the tunnel for MBS, such as N3 tunnel.

The apparatus 600, 700 may comprise user interface 640, 740 comprising, for example, at least one keypad, a microphone, a touch display, a display, a speaker, etc. The user interface 640, 740 may be used to control the respective apparatus by a user of the apparatus 600, 700.

In an embodiment, the apparatus 600 may be or be comprised in a second network node performing the method described above e.g. with respect to FIG. 2. For example, the apparatus 600 may be or be comprised in the network node 104. The apparatus 600 may be or be comprised in a SN.

In an embodiment, the apparatus 700 may be or be comprised in a first network node performing the method described above e.g. with respect to FIG. 3. For example, the apparatus 700 may be or be comprised in the network node 104. The apparatus 700 may be or be comprised in a MN.

According to an embodiment, with reference to FIG. 6, the control circuitry 610 comprises a receiving circuitry 612 configured at least to perform operations described with respect to block 202 of FIG. 2; a determining circuitry 614 configured at least to perform operations described with respect to block 204 of FIG. 2; a transmitting circuitry 616 configured at least to perform operations described with respect to block 206 of FIG. 2; and a utilizing circuitry 618 configured at least to perform operations described with respect to block 208 of FIG. 2.

According to an embodiment, with reference to FIG. 7, the control circuitry 710 comprises a determining circuitry 712 configured at least to perform operations described with respect to block 302 of FIG. 3; a transmitting circuitry 714 configured at least to perform operations described with respect to block 304 of FIG. 3; a receiving circuitry 716 configured at least to perform operations described with respect to block 306 of FIG. 3; and an initiating circuitry 718 configured at least to perform operations described with respect to block 308 of FIG. 3.

In an embodiment, at least some of the functionalities of the apparatus 600, 700 may be shared between two physically separate devices, forming one operational entity. Therefore, the apparatus 600, 700 may be seen to depict the operational entity comprising one or more physically separate devices for executing at least some of the described processes. Thus, the apparatus 600, 700 utilizing such shared architecture, may comprise a remote control unit (RCU), such as a host computer or a server computer, operatively coupled (e.g. via a wireless or wired network) to a remote radio head(s) (RRH) located in a base station or network node 104, for example. In an embodiment, at least some of the described processes may be performed by the RCU. In an embodiment, the execution of at least some of the described processes may be shared among the RRH and the RCU. For example, CU/DU split may utilize such shared architecture.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

According to an aspect there is provided a system comprising on or more apparatuses 600 and one or more apparatuses 700. In an embodiment, the system further comprises one or more UEs. In an embodiment, the system further comprises SMF and UPF.

As used in this application, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that utilize software or firmware for operation, even if the software or firmware is not physically present. This definition of 'circuitry' applies to uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1A to 5 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1A to 5 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1A to 5, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1A to 5 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, words and expressions herein should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

ABBREVIATIONS

5 MBS 5G Multicast Broadcast Service
DC Dual Connectivity
MBS Multicast Broadcast Service
MN Master Node
QoS Quality of Service
QFI QoS Flow Identifier
TNLI Transport Network Layer Information
SC-MRB Single Cell Multicast Radio Bearer SN Secondary Node
PSCell Primary Secondary Cell
UE User Equipment

The invention claimed is:

1. An apparatus comprising at least one processor, and at least one memory including program code, wherein the at least one memory and the computer program code are configured, with the at least one processor, to cause a second network node of a wireless communication network to perform operations comprising:
   receiving a message from a first network node configured to provide a multicast-broadcast service, MBS, for a user equipment, UE, the message comprising an MBS identifier identifying the MBS and at least one data flow identifier corresponding to at least one data flow, for providing the MBS, to be offloaded from the first network node to the second network node, wherein the secondary network node is in point-to-point mode;
   determining whether or not a tunnel, between the second network node and a user plane entity, associated with the MBS identifier exists;
   on the basis of the determining, transmitting, to the first network node, a response message indicating whether or not a new tunnel for the MBS is requested to be established; and
   utilizing the existing tunnel or said new tunnel requested to be established for providing the MBS,
   wherein the at least one memory and the computer program code are configured, with the at least one processor, to cause the second network node further to perform operations comprising:
   receiving, from the first network node, a request regarding a served UE to release at least one data flow configured to be used for providing the MBS for the served UE; and
   releasing the at least one data flow according to the request,
   wherein in the case that the tunnel between the second network node and the user plane entity associated with the identifier exists, the response message is generated such that it does not include transport network layer information on the existing tunnel, wherein the response message comprises a secondary node addition or modification request acknowledge message and includes a list of MBS flows that is accepted,
   wherein the at least one memory and the computer program code are configured, with the at least one processor, to cause the second network node further to perform operations comprising:
   determining a need to continue utilizing the tunnel between the second network node and the user plane entity for providing the MBS to at least one other UE after releasing the MBS service;
   indicating, to the first network node, the need to continue utilizing the tunnel, the indication comprising transport network layer information so that the correct tunnel is identified and a flag indicating continued need for the tunnel;
   wherein in the case that the UE leaves the MBS service in the second network node, the second network node does not release the tunnel and continues to use the tunnel to serve the at least one other UE.

2. The apparatus of claim 1, wherein in the case that the tunnel between the second network node and the user plane entity associated with the MBS identifier does not exist, the response message comprises a transport network layer information for establishing a tunnel between the second network node and the user plane entity, wherein the at least one data flow is transmitted on one or more Quality of Service (QOS) flows, the one or more QoS flows being the lowest level of granularity with which the network may differentiate user data and provide differentiated treatment,
   wherein the one or more QoS flows are identified by a QoS Flow ID (QFI) and has an associated QoS profile, wherein the response message comprises list of data QoS flows and their associated profiles,
   wherein the at least one memory and the computer program code are configured, with the at least one processor, to cause the second network node further to perform operations comprising:
   determining that a new tunnel for the MBS is needed between the second network and the user plane entity to transfer the one or more data flows of the MBS between the second network node and the user plane entity;
   transmitting a response message to the first network node indicating that the new tunnel is needed, the response message comprising a transport network layer information (TNLI) for establishing the new tunnel between the second network node and the user plane entity, the TNLI comprising information on the tunnel that is to be established, including an IP address of a tunnel endpoint and a tunnel endpoint identifier;
   allocating a new TNLI for the MBS and indicating this allocated TNLI to the first network node to set up the new tunnel, the response message comprising a Secondary Node Addition/Modification Request Acknowledge message, wherein the message includes a list of MBS QoS flows that could be accepted by the second network node and indicating accepted QoS flows with their mapped data radio bearer and including the TNLI to be used for the tunnel to be setup, wherein accepted QoS flows indicate the substantially same QoS flows or a subset of the QoS flows that were requested to be offloaded to the second network node.

3. The apparatus of claim 1, wherein in the case that the tunnel between the second network node and the user plane entity associated with the MBS identifier exists, the response message comprises a transport network layer information corresponding to the existing tunnel and an indicator for indicating that a new tunnel for said MBS identifier is not requested to be established, wherein the indicator is a one-bit indicator.

4. A method for a second network node of a wireless communication network, the method comprising:
   receiving a message from a first network node configured to provide a multicast-broadcast service, MBS, for a user equipment, UE, the message comprising an MBS identifier identifying the MBS and comprising at least one data flow identifier corresponding to at least one data flow, for providing the MBS, to be offloaded from the first network node to the second network node, wherein the secondary network node is in point-to-point mode;
   determining whether or not a tunnel, between the second network node and a user plane entity, associated with the MBS identifier exists;
   on the basis of the determining, transmitting, to the first network node, a response message indicating whether or not a new tunnel for the MBS is requested to be established; and
   utilizing the existing tunnel or said new tunnel requested to be established for providing the MBS,
   wherein the method further comprises:

receiving, from the first network node, a request regarding a served UE to release at least one data flow configured to be used for providing the MBS for the served UE; and releasing the at least one data flow according to the request, wherein in the case that the tunnel between the second network node and the user plane entity associated with the identifier exists, the response message is generated such that it does not include transport network layer information on the existing tunnel, wherein the response message comprises a secondary node addition or modification request acknowledge message and includes a list of MBS flows that is accepted, wherein the method further comprises:

determining a need to continue utilizing the tunnel between the second network node and the user plane entity for providing the MBS to at least one other UE after releasing the MBS service;

indicating, to the first network node, the need to continue utilizing the tunnel, the indication comprising transport network layer information so that the correct tunnel is identified and a flag indicating continued need for the tunnel;

wherein in the case that the UE leaves the MBS service in the second network node, the second network node does not release the tunnel and continues to use the tunnel to serve the at least one other UE.

5. The method of claim 4, wherein in the case that the tunnel between the second network node and the user plane entity associated with the MBS identifier does not exist, the response message comprises a transport network layer information for establishing a tunnel between the second network node and the user plane entity, wherein the at least one data flow is transmitted on Quality of Service (QOS) flows, the QoS flow being the lowest level of granularity with which the network may differentiate user data and provide differentiated treatment, wherein the QoS flow is identified by a QoS Flow ID (QFI) and has an associated QoS profile, wherein the response message comprises list of data QoS flows and their associated profiles, wherein the method further comprises:

determining that a new tunnel for the MBS is needed between the second network and the user plane entity to transfer the one or more data flows of the MBS between the second network node and the user plane entity;

transmitting a response message to the first network node indicating that the new tunnel is needed, the response message comprising a transport network layer information (TNLI) for establishing the new tunnel between the second network node and the user plane entity, the TNLI may comprising information on the tunnel that is to be established, including an IP address of a tunnel endpoint and a tunnel endpoint identifier;

allocating a new TNLI for the MBS and indicating this allocated TNLI to the first network node to set up the new tunnel, the response message comprising a Secondary Node Addition/Modification Request Acknowledge message, wherein the message includes a list of MBS QoS flows that could be accepted by the second network node and indicating accepted QoS flows with their mapped data radio bearer and including the TNLI to be used for the tunnel to be setup, wherein accepted QoS flows indicate the substantially same QoS flows or a subset of the QoS flows that were requested to be offloaded to the second network node.

6. The method of claim 4, wherein in the case that the tunnel between the second network node and the user plane entity associated with the MBS identifier exists, the response message comprises a transport network layer information corresponding to the existing tunnel and an indicator for indicating that a new tunnel for this MBS identifier is not requested to be established, wherein the indicator is a one-bit indicator.

* * * * *